HIGH-FREQUENCY MODULATED OSCILLATOR TRANSDUCER SYSTEM

Filed Aug. 13, 1951 2 Sheets-Sheet 1

INVENTOR

Paul Weathers

June 29, 1954 P. WEATHERS 2,682,579

HIGH-FREQUENCY MODULATED OSCILLATOR TRANSDUCER SYSTEM

Filed Aug. 13, 1951 2 Sheets-Sheet 2

INVENTOR

Paul Weathers

Patented June 29, 1954 2,682,579

UNITED STATES PATENT OFFICE 2,682,579

HIGH-FREQUENCY MODULATED OSCILLATOR TRANSDUCER SYSTEM

Paul Weathers, Haddon Heights, N. J.

Application August 13, 1951, Serial No. 241,657

17 Claims. (Cl. 179—100.4)

Figure 1:
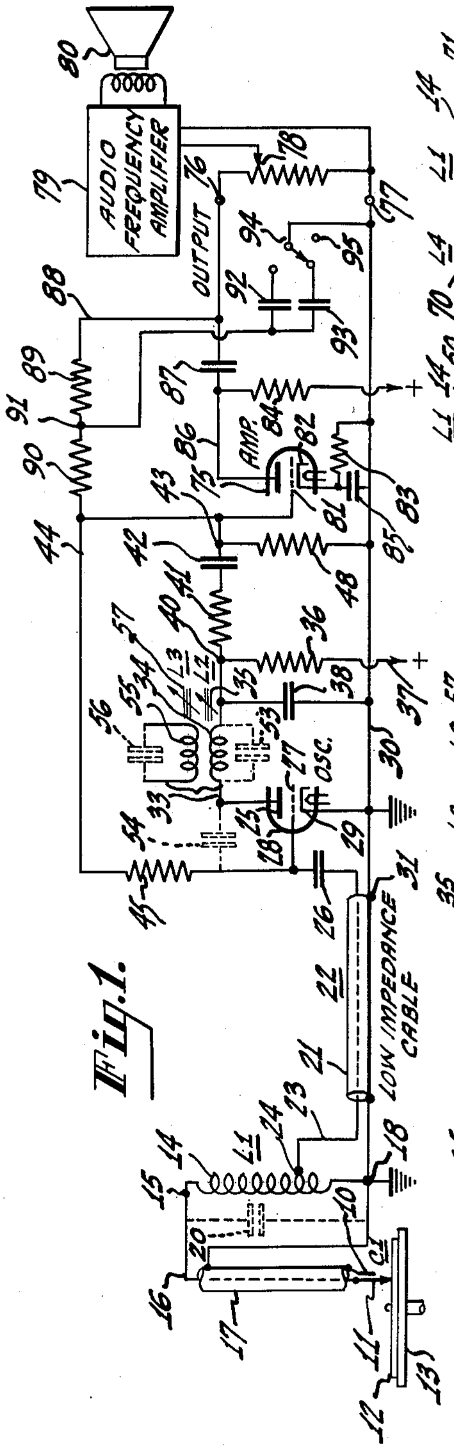

The present invention relates to electro-mechanical transducer systems for converting mechanical movement of a control element, such as the stylus of a phonograph pick up device, into corresponding variable electric currents or voltages capable of utilization to control or operate electrical sound reproducing means or other electrical apparatus responsive to the modulation. More particularly, the present invention relates to an electro-mechanical transducer system which is responsive to variations in the capacitance or inductance of a tuned, variable frequency control circuit. In one embodiment of the invention, variations of a minute variable capacitor by a phonograph record pick-up stylus provides the control action by capacity variation.

In the field of phonograph record reproduction, wherein the present invention finds its presently greatest usefulness, many variable capacity controlled transducer systems have been proposed heretofore but have not been used commercially to any extent due to various inherent disadvantages peculiar to each system. In each of the proposed transducer systems for phonograph record reproduction heretofore known, attempts have been made to obtain the advantages of light weight and low cost construction inherent in small variable capacitor devices as phonograph pick-ups and the like. As is well known, variable capacity pick-up devices for phonograph record reproduction are generally associated with various electron tube oscillator circuits for imparting a modulation characteristic to the output of such oscillators which is reproduced as sound in a connected phonograph system.

Due to a certain non-linearity of response inherent in the operation of a variable capacitor when the electrodes of the capacitor are at varying distances apart and moving in response to mechanical modulation imparted thereto by a phonograph record stylus for example, prior art systems of the modulated-oscillator type have mainly resorted to some form of balanced or double-sided variable capacitor arrangement of the electrodes, whereby as one part of the capacitor increases in capacity the other part decreases, and vice versa. The oscillatory circuit connected thereto is arranged to respond to the push-pull modulation control to effect some order of linearity of response in the reproduced signal or sound from the pick up device as is desired for faithful reproduction.

Certain of such push-pull or double-sided variable-capacitor modulation devices or transducers have been successful in the reproduction of sound or electrical signals, performing with a high degree of fidelity to the original record or mechanical movement imparted to the control element or stylus. However, due to the fact that at least two shielded connections must be made to such double-sided or push-pull variable-capacitor modulation devices, and because of their more complicated construction, and further because of the care that must be exercised in adjusting the central or movable electrode with respect to two normally fixed electrodes, for uniform response, and by reason of other inherent disadvantages common to all such systems in the matter of the requirement for relatively short connection leads to the modulator device, there has been no known commercial use of any variable-capacitance pick-up modulator or tranducer system up to the present time.

It is therefore a primary object of the present invention, to provide an improved electro-mechanical transducer system which not only eliminates all of the inherent disadvantages of prior known systems of the variable capacitance type, but which may operate with a high degree of efficiency and fidelity through the use of a single-sided or two-electrode variable-capacity element, as the electro-mechanical transducer or modulator means for the system.

It is also a further object of this invention, to provide an improved electro-mechanical transducer system which is particularly adapted for use in a phonograph record reproduction system or the like, and which utilizes a single-sided or "single-ended" variable-capacitor pick-up device without introducing distortion or noise in the output signal, and which is adapted to be connected with an electronic tube circuit in the system at an appreciable distance therefrom, without introducing signal losses or distortion.

It is also an object of this invention, to provide an improved signal reproduction system embodying an electro-mechanical transducer which is operable to frequency modulate an electronic tube oscillator from a remote point and at relatively high frequencies through a low impedance circuit or cable comprising a single shielded wire or conductor.

With a system of the character referred to, a small variable-capacitance pick-up device, in which the stylus element may be one electrode of a variable capacitor, may be connected through a single shielded conductor to an oscillatory electron tube circuit forming part of the invention. The conductor may be several feet in length whereby the remainder of the transducer system may be located or mounted more effectively and enclosed in proper shield means for preventing radiation, and the tone arm structure of the reproducing system may carry little more than the variable capacitor pick-up and be relatively light in weight, as is desirable for sound reproduction from modern micro-groove records. In fact with the advent and continuing extensive use of high fidelity micro-groove recordings, light-weight variable-capacity type transducer devices may be of increasing importance in the record industry if proper circuits are available. The present invention provides such a circuit and system therefor, in which the connecting link between the variable capacity device and the control circuit comprises a tuning inductance element and a single shielded conductor of the type normally used for piezo-electric crystal and other familiar types of pick up devices, together with a simple single-sided pick-up device of the variable-capacitance type.

Because of the fact that a transducer system embodying the invention provides for effectively controlling an electrical circuit through a single-sided variable capacity device and associated inductance in a tuned circuit as contrasted with the usual three wire or balanced control circuit of the prior art, variation of the associated inductance may also be provided for modulation as well as variation in the capacity, although the latter is presently preferred for phonograph record reproduction because of the light weight and simplicity of a simple two-electrode, miniature variable capacitor as the transducer element or device.

In view of the foregoing consideration, it is a further and important object of this invention, to provide a single-sided variable-capacity transducer system which is compensated to overcome the normal effects of non-linearity of response or non-linear capacitance variation of a two electrode variable capacitor, as the electrodes are moved toward and away from each other relatively in receiving modulation control, whereby the resultant sound or electrical signal output from the transducer system is a faithful replica of the original modulation movement imparted to the transducer or pick-up device.

It is also a further and more specific object of the invention, to provide a compensated single-sided or single-ended capacity pick-up system for phonograph record reproduction and the like embodying a two electrode variable capacity element as a modulator device and an electron tube oscillator circuit controlled thereby, and which permits the transducer device per se to be located as much as several feet away from the electron tube circuit referred to and connected thereto by means of a single-conductor shielded cable.

It is also an object of the invention, to provide a transducer system of the type referred to, in which the tuning control elements include the capacity of a two-electrode variable-capacity transducer device or a variable inductance element in a single tuned control circuit having a low impedance cable output connection for a high impedance electron tube input circuit or the like, thereby to minimize distortion in the reproduced electrical signal and stray signal pick-up.

Since electron tube circuits are most readily adapted for the control of electric currents and particularly for receiving and translating variations in the inductance or capacitance of an electrical circuit, it is also a further and important object of the invention, to provide an improved electron tube modulated oscillator circuit which is adapted to be frequency modulated by variations in capacity and/or inductance in circuit therewith at a remote point, through the intermediary of a single shielded conductor or cable connection. the variable capacitor element or the variable inductance element of a transducer system in accordance with the invention, may be actuated in response to any desired variable mechanical movement and in either case is readily adapted to respond to vibration from any source. The transducer element of a microphone, a vibration indicator of a phonograph pick-up device may be arranged as two electrodes of a small variable capacitor, one of the electrodes being moved by vibration as in the case of a vibration indicator, or arranged as a diaphragm element in a microphone, while in the case of the phonograph pick-up, one of the capacitor electrodes is moved by the stylus or is provided by the stylus itself. However, any suitable variable capacity device, or any variable inductance device operative at relatively high frequencies may be used in the system in accordance with the invention for effecting electro-mechanical signal translation.

A present preferred embodiment of the invention for the reproduction of phonograph records, for example of the micro-groove high fidelity type, may comprise an electron-tube oscillator having the anode circuit tuned in a frequency range between 2 and 45 mc. and preferably in a frequency range in the region of 20 mc. and slightly higher in frequency than the main tuning control circuit, which comprises a low impedance grid connection at a remote point with a tuning inductance directly tuned by a small shunt capacitor. The grid connection is made through a low impedance cable or shielded conductor tapped directly to or connected with a few coupling turns on the main tuning inductance which may be a single layer high Q winding or coil. In practice, for record reproduction, the small shunt capacitor is variable and comprises one electrode which is moved relatively to another to provide modulation under control of a stylus.

In certain modifications, the capacitance may be varied by dielectric change, or fixed, and the tuning inductance may be varied by a movable core element or any suitable means, to vary the tuning and the resonance frequency of the combined inductance and shunt capacitance in the control circuit.

The frequency of the tuning control circuit is slightly below the frequency of the anode circuit and is increased as the variable capacitor electrodes are separated more widely and is decreased as they are moved relatively more closely together. The oscillatory circuit is thereby caused to approach and recede from the anode circuit resonance frequency and to oscillate more or less strongly in accordance with the modulation variations of the loosely coupled tuning circuit. The oscillator grid resistor and the coupling capacitor arrangement is such that the modulation is detected by plate-bend rectification in the output anode circuit, and the modulation signals are further amplified and utilized as for sound reproduction, through an audio frequency amplifier connected to a suitable loud speaker device.

In addition, feedback control may be provided for the oscillatory circuit to control the frequency response to the low audio frequency ranges to prevent low frequency rumble in the sound output, such as may be caused by the operation of certain types of phonograph turntables.

Since the electron-tube oscillator system operates with the grid circuit loosely coupled to the control or modulation circuit which is tuned slightly below the resonant frequency of the anode circuit, second harmonic distortion and consequent inter-modulation distortion as when working with a strictly linear modulating circuit is eliminated. This is for the reason that while the variable-capacity transducer element may be a single-sided, two-electrode device, the elements of which move toward and away from each other relatively to decrease and increase the resonant frequency of the oscillator, the anode circuit is resonant at a slightly higher frequency than the main tuning circuit coupled with the grid and the tendency of the variable capacity to produce second harmonic distortion and consequent intermodulation is consequently balanced out. Therefore when the modulating capacity electrodes are close together small increments of movement of one of the electrodes produces the same demodulation output amplitude as when the electrodes are relatively farther apart and moving by the same small increments.

In accordance with the invention, this condition of linearity may further be enhanced in certain applications, and the compensating or discriminating action of the circuit may further be increased, by coupling an absorption circuit tuned to a lower frequency than the main tuning circuit, to either or both the anode and main tuning circuit inductance elements, preferably by adjustable inductive coupling. The sensitivity is also greatly enhanced by the fact that these circuits are tuned to a lower frequency than the main tuning control circuit, and absorb energy increasingly as the latter circuit tuning is varied in a direction to decrease the main or operational frequency, that is, as the operational frequency recedes from the anode circuit resonance frequency.

It will therefore be seen that in a transducer system, in accordance with the invention, single-sided variable-capacity means may effectively be utilized for relatively high percentage modulation or signal translation without distortion, although normally a variable single-sided capacitor tends to produce second harmonic distortion and consequent intermodulation when working with a linear modulating circuit such as a frequency modulated oscillator. This is balanced out by producing nonlinear modulation with a given shift in frequency so that whether the capacitor electrodes are close together or widely spaced, the same small increments of relative movement of the electrodes produces the same amplitude of modulation signal output.

Furthermore, since the modulation or oscillator tuning control circuit is loosely coupled to the grid through a relatively low-impedance circuit or cable, the "Q" of the main tuning or modulation circuit may be relatively high and controlling as to the frequency of the oscillatory circuit, although the resonant frequency of the anode circuit is set at a value slightly higher than that of the modulation circuit.

Figure 2:
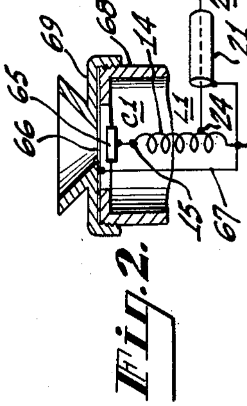
Figure 3:
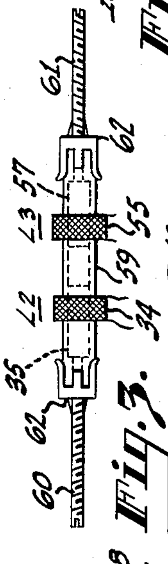
Figure 4:
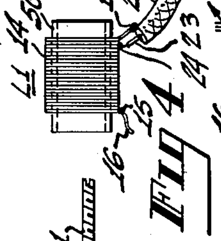
Figure 6:
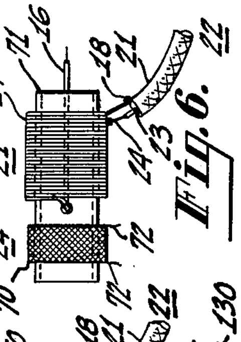
Figure 8:
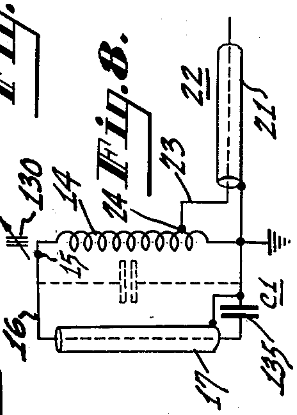
Figure 7:
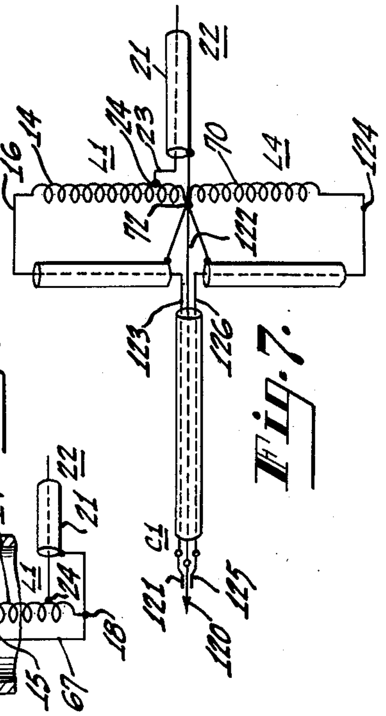
Figure 7:
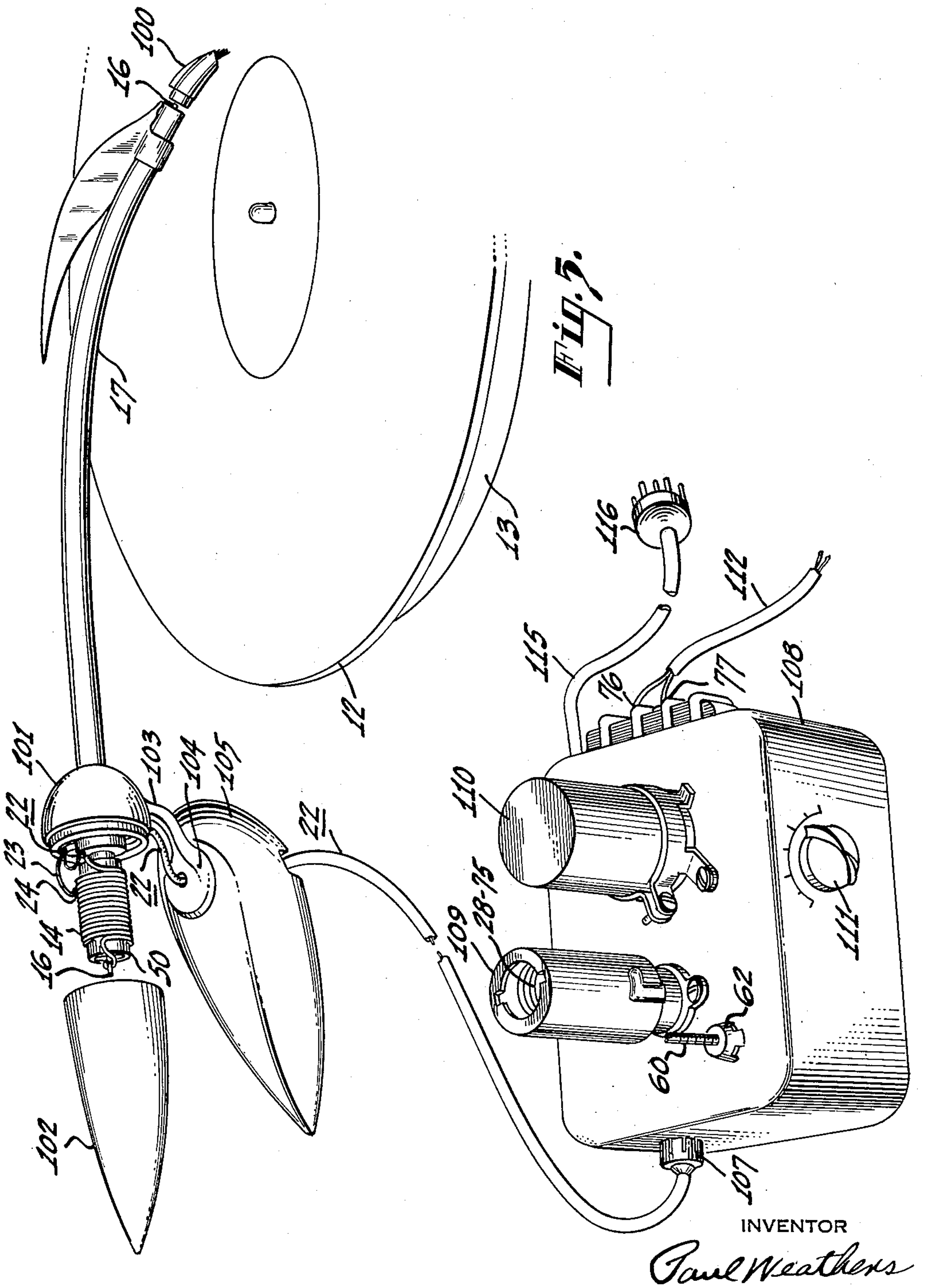

The novel features that are considered to be characteristic of this invention will further be understood from the following description of certain presently preferred embodiments thereof, and are set forth with particularity in the appended claims. Furthermore, the invention, both as to its organization and method of operation, as well as additional objects and advantages thereof, will likewise further be understood from the following description when read in connection with the accompanying drawings illustrating presently preferred embodiments thereof as hereinbefore referred to and in which Figure 1 is a schematic circuit diagram of a compensated single-sided variable-capacity transducer system embodying the invention, Figure 2 is a schematic circuit diagram of a modification of the circuit diagram of Figure 1 showing an alternative form of modulator or transducer device for said circuit, Figures 3 and 4 are plan views, substantially full size, of certain inductive tuning elements adapted for use in the system of Figure 1, Figure 5 is a view in perspective, and substantially full size, of the physical embodiments of the transducer system of Figure 1, arranged in accordance with the invention, Figure 6 is a plan view, substantially full size, of a modification of the inductance element of Figure 4 in accordance with the invention, and Figures 7 and 8 are further schematic circuit diagrams of a portion of the circuit of Figure 1 showing different modulating devices for the transducer system, in accordance with the invention. Like reference characters throughout the various figures of the drawing refer to like parts.

Referring to Figure 1, a tuning inductance $L_1$ and a shunt tuning capacitor $C_1$ are provided to resonate at a predetermined mean frequency such as 16.0 mc. for example. The frequency of the circuit may be varied by variation of either the inductance $L_1$ or the capacity $C_1$. In the present example, the capacitance $C_1$ is arranged to be varied as an electro-mechanical transducer element for the reproduction of phonograph records, and is provided by two small closely spaced electrodes 10 and 11 providing a variable capacitor. The electrode 11 is provided as a stylus element for engaging a phonograph record 12 on a phonograph turntable 13 as shown in the drawing. The record groove modulation is arranged to mechanically move the electrode 11 with respect to the electrode 10 which is fixed, and so varies the spacing between the electrodes and the capacity provided by the electrodes as a variable, single-sided capacitor.

The inductance $L_1$ is provided preferably by a single layer, high Q winding or coil 14 connected at one terminal 15 through a conductor or lead 16 with the movable electrode 11 of the variable capacitor. The lead 16 is shielded by a conductor element 17 such as a tone arm, through which it passes. The opposite terminal 18 of the coil or winding 14 is connected to the tone arm or shield 17 and through it to the other capacitor electrode 10, thereby placing the capacitance provided by the electrodes 10 and 11 directly in shunt with the inductance winding 14 along with stray capacitance 20 provided by the winding 14 and the capacitance between the shield or arm 17 and lead 16. The terminal 18 and the one capacitor electrode 10 are grounded as indicated, preferably to the chassis of the record playing device of which the turntable is a part, and also are connected to the outer shielded conductor 21 of a low impedance cable 22, the central conductor 23 of which is connected to a tap 24 on the inductance winding 14 one or more, and in no case more than a few turns from the terminal 18. In the present example it may be considered to be connected to include three turns.

In any case the circuit through the cable 22 is of relatively low impedance and is inductively coupled to the tuning inductance 14 ($L_1$) by the few coupling turns referred to, between the tap 24 and the terminal 18. The low impedance cable 22 may be any convenient length up to, for example, approximately four feet, when operating the tuning circuit $L_1$—$C_1$ in the range of 16.0 mc. This provides for remotely locating the tuning or translating circuit with respect to the remainder of the system, and the tubes and circuitry thereof, and permits the tuning inductance element 14 to be located on the tone arm of a phonograph pick up system, for example, at one end theerof while the variable capacitance $C_1$ is provided at the opposite end, the conductor 16 may conveniently extend through the tone arm being a single conductor. The tone arm may be of metal or other conducting material for effective electrical shielding. In the case of tone arms of insulating material, the shielding may be taken to represent the normal braided or other flexible conductive cover provided on shielded conductors for audio frequency currents. The physical embodiment of the circuit of Figure 1 will hereinafter further be discussed in connection with Figure 5.

At the opposite end of the low impedance cable 22, the central or insulated conductor 23 is connected through a coupling capacitor 26 to the control grid 27 of an electronic oscillator tube 28, such as a triode, having a cathode 29 and an anode 25. The cathode is connected to chassis ground and to a grounded conductor 30, which in turn is connected to the shield 21 of the cable 22 as indicated at 31, thereby connecting the grounded side of the system conductively to the capacitance $C_1$ and electrode 10. The conductor 30 represents any suitable grounded common circuit lead or conductor means for the system.

The anode 25 of the oscillator tube 28 is provided with an anode circuit 33 in which is connected serially a tuning inductance $L_2$ provided by an inductor winding or coil 34 adjustably tunable by a movable ferrite or other magnetic core 35. The anode circuit 33 is further provided by an anode coupling impedance or resistor 36 in series with the inductor 34 and connectable to any suitable source of positive anode operating potential through a supply lead 37. A by-pass capacitor 38 is connected between the junction of the inductor winding 34 and the resistor 36, and the ground conductor 30, thereby providing a high frequency path for R. F. currents from the winding 34 to the cathode 29.

The anode terminal 40 of the anode coupling resistor 36 is connected through a potential dropping resistor 41 and a blocking capacitor 42 with a modulation or audio frequency output terminal 43 and this terminal is also connected back through a feed back circuit provided by a lead 44 and a grid resistor 45, to the grid 27 of the oscillator tube 28. The grid resistor 45 thus serves to control the feedback of energy from the anode circuit at terminal 43 to the grid, and at the same time serves to control the bias potential on the grid of the oscillator. In this case the grid capacitor 26 may have a value of the order of 0.25 mfd. while the grid resistor 45 may have a value of the order of 10 megohms. The grid circuit lead includes a further output coupling resistor 48 connected between the output terminal 43 and the common ground conductor 30 for the system. This latter resistor may have the value of the order of 1 megohm. The by-pass capacitor 38 for the anode resistor 36 may have a value of 50 mmf., the coupling resistor 36 may have a value of 33,000 ohms and the decoupling resistor 41 may have a value of 220,000 ohms.

For operation in the range of frequencies referred to, the inductance $L_1$ may comprise approximately 34 turns of No. 28 enamel covered wire wound in a single layer on a 3/8 inch diameter coil form, and have a full size construction substantially as shown in Figure 4, to which attention is now directed.

The coil form 50 is a hollow tube of insulating material and extends beyond the ends of the winding. The low impedance cable shield or outer conductor 21 is connected to one end terminal 18 of the coil while the central conductor 23 is connected to the tap 24 approximately three turns from the end terminal 18. The high potential terminal 15 of the inductance winding 14 is shown at the opposite end of the winding and is extended for connection with the modulation capacitor as shown in Figure 1, through the lead 16.

Considering now the operation of the system, the tuning of the main control inductance $L_1$ by the pick-up capacitance $C_1$ and the capacitance of the concentric line 16—17 in the tone arm, is adjusted to resonate at a frequency $f_1$, with the capacitance $C_1$ as the only variable tuning element for the system. The inductance $L_1$ is relatively loosely coupled to the grid 27 of the electron oscillator tube 28 by means of the low impedance grid circuit which includes the three turn coupling winding between the tap 24 and the terminal 18 and the transmission line 22, with the grid coupling capacitor 26 between the line and the grid.

The anode tuning inductance 34 ($L_2$) is adjusted by a movable tuning core 35 to a frequency $f_2$ slightly higher than the frequency $f_1$ of the main tuning inductance $L_1$. In this case it may be assumed to resonate at a frequency of 18.0 mc.

Oscillations are generated by the tube 28 which is preferably a high-mu triode, by adjusting the anode inductance $L_2$ so that it resonates at a frequency $f_2$. The inductance $L_2$ is tuned by its distributed capacity 53 and the grid-to-anode capacity 54 ($C_{gp}$) which is effectively in series with the grid coupling capacitor 26 and the three turn coupling coil to ground. The low potential or B+ end of the anode inductance $L_2$ is returned to ground through the by-pass capacitor 38. The impedance $C_{gp}$ is exceedingly high compared with the impedance of the capacitance of $C_1$, and the impedance of the grid coupling coil, but there is sufficient coupling through $C_{gp}$ to energize the grid circuit and in turn the main tuning inductance $L_1$. This produces steady state oscillation as long as the tuning of $L_1$ and $L_2$ is not disturbed.

As stated, the inductance $L_2$ is so chosen that with a properly adjusted magnetic tuning core it resonates with its associated capacities to a frequency slightly higher than that of the modulation control circuit $L_1$—$C_1$. Oscillation is induced by the capacity coupling 54 between plate and grid of the oscillator tube 28. Since the inductance $L_1$ is loosely coupled to the grid circuit through the transmission line and the three turn winding, its Q is much higher than that of the anode inductance $L_2$, and it determines in a large measure the frequency of oscillation. The tuning of inductance $L_2$ effects the frequency of oscillation only slightly.

The transducer system is highly sensitive to frequency modulation by small changes in capacity ($C_1$) or inductance ($L_1$). The adjustment of inductance $L_2$ is such that no blocking occurs with normal variation in line voltage to the power supply for the system, and so that oscillation does not stop at the lowest supply voltage limit.

When the electrodes 10—11 of the pick-up capacitance $C_1$ are moved farther apart by modulation action, $L_1$ is tuned to a higher frequency and approaches the frequency $f_2$. This produces simultaneous effects. First as $f_1$ approaches $f_2$ more energy is transmitted from $L_2$ through $C_{gp}$ to the grid coupling turns and to the main tuning inductance $L_1$. Secondly, the grid-to-anode capacitance $C_{gp}$ increases effectively as the gain of the electron tube 28 increases by virtue of the increased regeneration. Thus $C_{gp}$ increases coincidentally with a decrease in $C_1$ but its tuning effect is substantially totally across $L_2$ in the anode circuit due to the fact that the grid circuit of the tube 28 operates at a very low impedance through the low impedance transmission line 22 and the three turn coupling winding on the main tuning inductance. When the electrodes 10—11 are moved closer together, the frequency $f_1$ decreases and the oscillations decrease in amplitude as conditions of operation are reversed.

In either case, as the pick-up capacitance $C_1$ changes, an equal and opposite change in $C_{gp}$ occurs coincidentally and this causes the frequency of $L_2$ to move towards and away from the frequency of $L_1$, thus producing an effect similar to that of having push-pull capacitors across $L_1$ and $L_2$ with a common grounded movable armature. It can also be seen that if $f_1$ were tuned higher than $f_2$ the fluctuations of $C_{gp}$ would be in the same direction as $C_1$ and the resultant discriminating action of $L_2$ would substantially be cancelled.

A further study of the circuitry reveals that the tuning action of $C_{gp}$ on $L_2$ is effective largely by virtue of the fact that the impedance of the grid circuit is extremely low. From this consideration it will be appreciated that if the grid circuit impedance were comparable to that of the anode circuit, the fluctuations of $C_{gp}$ would increase or decrease both the anode and the grid circuits in the same direction and the operation would be wholly ineffectual.

The construction of the inductor 34 constituting the anode inductance $L_2$ may be substantially the same as that for the inductor 14 constituting the inductance $L_1$ as shown in Figure 4 and thus may comprise a single layer, high Q winding of substantially the same number of turns and provided with a movable tuning core as indicated in Figure 3. In one modification of the invention the main tuning inductor $L_1$ of substantially 32 turns is tuned to a frequency of 20.8 mc., while the anode tuning inductor $L_2$ comprises 30 turns in a single layer adjusted by means of the movable core 35 to an optimum operating frequency between 21 and 22 mc.

From the foregoing consideration of the circuit of Figure 1, it will be seen that the oscillator grid circuit is loosely coupled to its tuning control or modulation circuit $L_1$—$C_1$ through a low impedance cable connection 22 constituted by a single shielded conductor and a coupling winding of few turns. The cable connection may be of ordinary shielded single conductor construction normally used in the present phonograph circuits for the conveyance of audio frequency signals and is therefore of low cost. At the same time it may be of sufficient length to connect to any phonograph apparatus with which the system may be used.

While the transducer system of the present invention provides an improved type of frequency modulated oscillator adapted to be modulated effectively by single-sided variable capacity means, variation of the value of either the capacitance $C_1$ or inductance $L_1$, constituting the remote tuned control circuit of the oscillator may be utilized for modulation. The invention provides means for picking up the motion of any movable or vibratory body, or body of material, moving with respect to the inductance $L_1$ and in its field. The tuned control circuit $L_1$—$C_1$ may be located several feet away from the oscillator or amplifier tube and other circuitry, and is connected thereto by low impedance line means such as the conventional variety of pick up cable. The tap on $L_1$ is about three turns on a thirty four turn coil. Oscillation is accomplished by tuning $L_2$ with its associated winding capacity and grid-to-anode capacity 54 of the tube 28, to a frequency $f_2$ higher than the normal steady state or mean resonant frequency $f_1$ of the tuned control circuit $L_1$—$C_1$. Then variations in the resonance of the control circuit $L_1$—$C_1$ varies the frequency of oscillation and moves the oscillation frequency nearer or farther away from that of the anode inductance $L_2$ and its associated capacities. Thus frequency modulation results and rectification takes place about the plate bend characteristic of the oscillator tube, thus producing a replica of the modulation signal or movement between the output terminal 43 and ground lead 30.

Both tuning inductances $L_1$ and $L_2$ may be provided by a high Q coil consistent with space limitations and are tuned by relatively small capacitance means, together with adjustable core means in the case of $L_2$. The mean frequency of the circuit $L_1$—$C_1$ may be set at various values as low as 2 mc. and as high as 45 mc. The optimum frequency setting appears to be of the order or in the region of 20 mc. The optimum frequency is in part determined by the permissable length of low impedance transmission line 22 and the size of the inductance $L_1$.

The low impedance transmission line or cable length must be such that its natural period, as determined by its length and phase angle of its terminations, must not be an integral multiple of the oscillation frequency, otherwise the line may reflect strong harmonic signals and become sensitive to stray signals which are multiples of the oscillator frequency. The transmission line may be connetced to the end of the first, second or third turn from the ground end of tuning coil 14 ($L_1$) depending upon the degree of coupling desired.

The control grid may have an extremely high resistance return 45—48 to the cathode, and in order to produce rapid recovery from blocking or from low frequency modulation, inverse feedback at very low frequency may be introduced from the anode to the grid of the oscillator through the feedback connection 44. The capacitor 26 bypasses all signal energy at desired frequencies back through the transmission line and tap on inductance $L_1$ to ground. The selection of the capacitor 26 and the resistor 45 is such that attenuation can start at any desired low frequency, to reduce turntable rumble for example, or other undesirable low frequency modulation of the carrier frequency.

Since a variable capacity tends to produce second harmonic distortion and consequent intermodulation when working a strictly linear modulating circuit, it is desirable to balance out this effect by producing non-linear modulation with a given shift in frequency. In the present system when the control electrodes 10—11 are close together, small increments of movement of the electrodes produce the same amplitude of demodulated output as when the electrodes are farther apart and moving by the same small increments.

In the modification of the transducer means shown in Figure 2, the tuning inductance 14 is connected to the low impedance cable at the terminal 18 and the tap 24 in the same manner as in the circuit of Figure 1 and for the same purpose. The high potential terminal 15 of the tuning inductance is connected to a small insulated button or electrode 65 positioned in spaced relation to a metallic or conductive diaphragm 66 which is connected through a lead 67 with the terminal 18 of the inductance, thereby placing the modulating capacitor electrodes constituted by the button 65 and the diaphragm 66, directly in shunt across the tuning inductance 14 much in the same manner as the electrodes 10 and 11 of the phonograph pick-up device of Figure 1.

The diaphragm 66 is mounted in a suitable housing indicated at 68 and is provided with a mouth piece or cover element 64 through which sound is directed from the exterior of the microphone. Sound impinging upon the diaphragm serves to vary the spacing between the electrodes 66 and 65 and thereby varies the tuning of the inductance $L_1$. This form of modulating device is only shown by way of example. Other modulating or control devices or sound translating means adapted for use in connection with the invention may be provided for different purposes, whereby a small change in the capacitance $C_1$ or the inductance $L_1$, and the tuning of the control circuit, may be effective to vary the signal output.

The discriminating action as well as the sensitivity may be increased when desired as for increased signal output, by coupling a circuit, including an inductance element $L_3$, tuned to a lower frequency than $L_1$—$C_1$ to either inductance $L_1$ or $L_2$, or both. In the circuit of Figure 1 for example, the inductance $L_3$ absorbs energy from the inductance $L_2$ and is tuned to a lower frequency than the circuit $L_1$—$C_1$ and loosely coupled inductively. In some applications it is expedient to eliminate the absorption coil for $L_1$, as in Figure 1, for the sake of saving space.

The tuning winding $L_3$ loosely coupled to the inductance $L_2$, in the present example, comprises an inductive winding or coil 55 tuned by its stray capacity 56 and a movable tuning core 57 of ferrite or other suitable high frequency magnetic material. This winding is adjusted to resonate at a frequency slightly lower than the freqeuncy of inductance $L_1$ and in the present example may be assumed to be adjusted to a frequency $f_3$ of the order of 15.4 mc. Thus in this modification, the inductances $L_2$ and $L_3$ are resonant respectively at frequencies slightly above and below the resonant frequency of the main tuning inductance $L_1$. The physical embodiments of the inductance elements $L_2$ and $L_3$ for the anode circuit of the oscillator are shown in Figure 3, to which attention is now directed along with Figure 1.

The construction is shown substantially full size. Both inductance windings are mounted in coaxial, spaced relation on an elongated tube or coil form of insulating material 59 substantially ¼ inch in diameter. The inductance elements $L_2$ and $L_3$ constituted by the coils 34 and 55 respectively are both scramble wound and each occupies substantially ⅛ inch in width along the length of the coil form. The winding 34 has 24 turns of No. 36 enamel covered wire while the winding 55 has 30 turns of the same size wire, in the present example. The windings are spaced as shown, a distance of substantially three-eighths of an inch to provide loose inductive coupling between them. Within the coil form are two tuning cores 35 and 57 positioned for controlling the tuning of the windings and are movable by means of threaded tuning control rods 60 and 61 respectively, operating through suitable metallic threaded end caps 62 carried by the coil form. The main tuning inductance $L_1$ may likewise be of small size so that it may readily be mounted on a tone arm, or in other transducer devices such as a microphone as shown in Figure 2 and in connection with a single conductor control cable such as the cable 22 of the circuit of Figure 1.

Referring now to Figure 6 along with Figures 1 and 4, the main tuning inductance for the modulation circuit $L_1$ may also be provided, in certain applications, with a tuned absorption inductance $L_4$ comprising a random wound coil 70 loosely inductively coupled to the inductance $L_1$ or winding 14 and mounted on the same coil form 71. In this case the absorption winding 70 is substantially ¼ inch in length and is spaced approximately the same amount from the inductance winding 14 although this distance may be varied by moving the winding 70 to acquire proper coupling for frequency control.

The low impedance cable is connected to the inductance in the same manner as shown in Figure 4 and for the same purpose. The only difference between this modification and that of Figure 4 is the addition of the absorption winding 70 which is tuned by its own distributed capacity, the coil ends 72 being open and normally secured to the coil form. The arrangement is such that the inductive winding 70 is tuned to the same frequency as the inductive winding 55, that is $L_3$, which is a frequency slightly below the frequency of the main winding or tuning inductance $L_1$ as hereinbefore described.

If the inductance $L_4$ is coupled to the main tuning inductance $L_1$ and tuned to a lower resonant frequency, then when the pick-up capacity $C_1$ increases, an increasing amount of absorption occurs in the inductance $L_4$ and the oscillation amplitude is further decreased by the absorption action. The decrease in amplitude is more marked by virtue of the oscillation frequency shifting away from the natural resonance of the anode circuit and toward the natural resonance of the tuned inductance $L_4$.

Likewise, when the inductance $L_3$ is coupled to the inductance $L_2$ and tuned to a lower frequency than the inductance $L_1$, the shift in frequency of the circuit $L_1$—$C_1$ toward the resonance of the inductance $L_3$ produces a marked decrease in amplitude of oscillation by the increased absorption by the inductance $L_3$. The combination of the two inductances $L_4$ and $L_3$, each absorbing oscillation energy when the resonance of the circuit $L_1$—$C_1$ swings toward their natural period, and marked increase in amplitude when the resonance of the circuit $L_1$—$C_1$ swings toward the resonance of the inductance $L_2$, produces a high degree of sensitivity where desired.

Having now considered the single-sided variable-capacity transducer system in certain modifications, reference is again made to Figure 1 and additional circuits for utilizing the signal output of the modulation system. In the present example these include an audio frequency amplifier comprising an amplifier tube 75 having signal output terminals 76 and 77 connected through a gain control potentiometer device 78 to further audio frequency signal amplifier means 79, and a loud speaker 80, for a sound reproduction system. This is by way of example, and shows the use of the invention for the reproduction of phonograph records through signal amplifying and sound reproducing means.

In the present circuit arrangement for the amplifier 75, a control grid 81 is coupled to the output terminal 43 across the resistor 48 of the modulation system. The cathode 82 of the amplifier tube is connected through a self-bias resistor 83 to the ground conductor 30. The latter resistor is provided with a suitable by-pass capacitor 85 for audio frequency currents. The anode circuit 86 of the amplifier tube 75 includes an anode resistor 84 coupled through a suitable coupling capacitor 87 to the amplified signal output terminal 76. Also coupled to the anode resistor and the output terminal 76 is a feedback circuit comprising a lead 88 and two series feedback control resistors 89 and 90 connected with the control grid 81 and the modulator output terminal 43. The junction 91 of the two feedback resistors 89 and 90 is connected back to the ground lead 30 selectively through two feedback control capacitors 92 and 93 and a selector switch 94 having one terminal or contact 95 which permits the connection to be opened.

This capacitor circuit permits the degree of feedback to be controlled for different types of records. In the present example, the resistors 89 and 90 may each have a value of approximately 220,000 ohms, while the capacitors 92 and 93 have capacity values of respectively .001 and .005 mfd. for the compenstaion of micro-groove and 78 R. P. M. shellac records, respectively. The open position 95 of the switch permits the full normal feedback for the playing of transcription records. This control is made part of the system when mounted in a common shielding container as a unit. In that case the two tubes 28 and 75 may be provided by separate electron tubes such as two 6AT6 commercial type electron tubes as available on the market, or by one 12AX7 twin triode, the latter being indicated in the drawing and shown in Figure 5 to which attention is now directed.

In Figure 5, the physical embodiment of the circuit of Figure 1 from the pick-up device through to the output terminals is shown. The pick-up or capacitor element is contained within a detachable head 100, which in operation is connected to the tone arm 17 in such a manner that the central conductor 16 is connected with the electrode 11 as indicated in Figure 1. The tone arm provides a shield for the conductor which is insulated therefrom. The rear end of the conductor 16 as shown is connected to one end of the tuning inductance 14, the opposite end of the tuning inductance is connected to the output cable 22, the inner conductor 23 of which is connected with the tap 24 as shown also in Figures 1 and 4. The main tuning inductance provided by the winding 14 may be mounted at the rear end of the tone arm on the coil form 50 and is arranged to be enclosed in a separable housing comprising a base 101 and a cover 102.

The tone arm base 101 is pivoted on a bracket 103 for movement of the tone arm in a vertical plane and is provided with a swivel connection 104 with a base or pedestal 105 which is adapted to be mounted near the phonograph turntable 13 on which is shown the record 12 in a playing position.

The low impedance cable is extended and provided with a plug-in connection 107 for the remainder of the oscillator and amplifier system of Figure 1, which is contained within a shielding housing 108. The oscillator and amplifier tube 28—75 which is a dual triode as before mentioned, is mounted on top of the housing 108 and provided with a suitable shield cover 109. The tuning rod 60 for the inductance $L_2$ is extended above the top of the casing as shown, for adjusting the resonant frequency of the anode circuit. The housing 110 on the casing 108 contains various filter capacitors for the oscillator and amplifier operating voltage circuits and does not concern the invention. The feedback control switch 94 for the capacitors 92—93 is inside the housing and is provided with a control knob 111 which appears on the side of the housing 108. The output terminals 76 and 77 for the system are connected with a shielded output cable 112 leading to utilization means such as shown in Figure 1. Operating potentials from any suitable source (not shown) are applied to the amplifier-oscillator system through a supply cable 115 provided with a suitable plug-in connector 116.

The physical embodiment of the circuit of Figure 1 and its modifications may take other forms than as shown in Figure 5. However, for phonograph record reproduction, its construction and arrangement provides a compact two-unit system readily adapted for use in connection with associating radio receivers, television receivers and amplifiers to provide phonograph record reproduction with high fidelity.

Referring now to Figure 7 along with Figure 1 and Figure 6, the main tuning inductance winding 14 is shown with output connections 23 and 21 for the low impedance cable 22, and with end connections to a modulating capacitor comprising a movable stylus electrode 120 and fixed electrode 121, through leads 122 and 123 respectively, whereby it is operative to control the modulation or transducer system in the same manner as described for the circuit of Figure 1 in connection with the variable capacity element 10—11.

In the present modification, the inductance $L_4$ comprising the winding 70, is arranged to be tuned additionally and variably by the movable stylus electrode 120, through the use of a second fixed electrode 125 on the opposite side of the movable electrode 120 from the electrode 121. The electrode 125 is connected through a lead 126 with one terminal 124 of the winding 70. The opposite terminal 72 is connected to the grounded shield conductor 21. In this manner, as the electrodes 120—121 separate in response to modulation action of a record groove, the frequency of the tuned circuit $L_1$—$C_1$ increases while at the same time the frequency response of the inductance 70 decreases by reason of the fact that the capacitor elements 120—125 approach each other more closely, thereby more rapidly separating the resonance frequencies $f_3$ and $f_1$ of the absorption coil 70 ($L_4$) and of the tuning coil 14 ($L_1$) respectively, so that the damping effect of the coil 70 is more effectively removed by a wider frequency margin while the tuning of the inductor $L_1$ approaches that ($f_2$) of the inductance 34 ($L_2$) in the anode circuit.

Conversely, as the electrodes 120—121 move close toward one another, the frequency $f_1$ is lowered away from the frequency $f_2$ of the anode circuit and approaches the frequency $f_3$ of the inductance $L_4$. The resonance frequency $f_3$ is increased or raised toward that of the main tuning inductance $L_1$ by the same electrodal action, since the electrodes 121 and 125 are more widely separated. Therefore more effective modulating action results from a given movement of the stylus or electrode 120 and a greater signal output results because of the higher effective percentage modulation.

Variably tuning an absorption winding therefore, further enhances its operational effect upon the tuning inductance with which it is associated. However, this arrangement is not normally resorted to for the reason that sufficiently wide frequency range of operation is normally obtained without the absorption windings or at most by the use of the one absorption winding 55 ($L_3$) in connection with the anode circuit.

Referring now to Figure 8, the input or modulation of the circuit of Figure 1 may be modified to provide a movable tuning core element 130 for varying the frequency of operation of the control circuit while permitting the capacitor $C_1$ to remain fixed, thereby providing modulation by variation of the inductance of the winding 14. This is also effective but is used normally for effecting a modulation signal output in connection with more slowly movable elements than a phonograph stylus and is not normally used for record reproduction. In the present example the capacitance $C_1$ may be provided by a normally fixed capacitor 135 which is of relatively small capacity value. The inductance $L_1$ in this modification may be in any suitable form for responding to changes in its inductive field for any purpose.

From the foregoing description it will be seen that in accordance with the present invention, there may be provided through a controlled oscillator circuit, effective frequency modulation with a remotely tuned circuit comprising a relatively small capacitance means and a shunt inductance element substantially loosely coupled to the oscillator grid through a low impedance coupling circuit such as a single shielded conductor and a few low inductance coupling turns, and that the distortion effects of a variable capacitor as a transducer element is compensated by the relation of the tuning response or resonance of the oscillatory anode and tuning control circuits, the former being tuned to a higher frequency so that with the modulation control circuit loosely coupled to the grid, the oscillatory system approaches and recedes in frequency response from the resonant frequency of the anode circuit as the control circuit tuning operates in response to mechanical modulation. In this manner more effective control by the variable capacity or inductance means is provided when the oscillations tend to weaken and less effective control is provided when the oscillations tend to increase in strength as the modulating element moves, whereby the modulation output is maintained substantially constant regardless of whether the electrodes of the modulation capacity means for example, are close or relatively far apart when moving in response to mechanical modulation.

This system is further adapted for effective frequency modulation by either the capacitor element or the inductive element of the tuned control circuit and provides effectively for response to any mechanical movement which varies the tuning of the loosely coupled control circuit.

In one of its aspects, the invention provides a highly simplified type of frequency modulated oscillator capable of being modulated by a single-sided variable-capacity. Furthermore the variation of the value of either the capacitor or the inductance of a high Q tunable circuit constituting the remote or loosely coupled tuning element of the oscillator may be utilized for signal translation or modulation. By reason of the fact that the system provides compensation for the action of a single-sided capacity as a modulation device, the transducer system is highly effective and efficient as a compensated single-sided capacity pick-up system for phonograph record reproduction, as one of its present preferred uses. In this connection, the system of the present invention provides a modulated oscillator with a substantially linear demodulated output whereby the same demodulated signal output is obtained with a single-sided capacity pick-up device when the electrodes thereof move relatively over the same increments of amplitude at differing distances apart.

Furthermore, as will be seen from a consideration of the embodiment of the invention as described and shown herewith, a single-sided capacity pick-up in the control circuit serves not only to vary the tuning of the control circuit inductance directly, but also serves to vary the tuning of the anode circuit inductance indirectly through a variation of the inter-electrodal capacity of the oscillator tube between the anode and the grid, since the tuning range of the control circuit is below the resonance frequency of the anode circuit and because of the fact that the low impedance grid circuit is interposed between the grid and the main tuning control circuit.

The system thereby provides, with a simple modulator device, such as a two-electrode variable capacitor, all of the advantages of the known push-pull or double-sided variable capacitor or like modulator means including the advantage of relatively high gain or signal output with an electronic tube oscillator, and permits the use of the push-pull or double-sided modulation means to further enhance the modulation effect when desired.

What is claimed is:

1. An electro-mechanical transducer system comprising in combination, a high frequency electron-tube oscillator having a high impedance anode circuit and a low impedance grid circuit, a tuning inductor in the anode circuit, means including the grid-to-anode capacity of said oscillator for tuning said inductor to a predetermined high frequency, a main tuning control circuit for variably controlling the frequency of said oscillator to effect modulation thereof, said tuning control circuit comprising a second tuning inductor and a shunt tuning capacitor therefor having a relatively low capacity value, at least one of said last named tuning elements being variable, means providing a relatively loose signal conveying coupling connection for said grid circuit with said tuning control circuit, means for adjusting the resonance of said anode circuit to a frequency slightly higher than the mean resonance frequency of said tuning control circuit whereby as the tuning of the main tuning control circuit is varied the grid-to-anode capacity effectively varies the tuning of the anode circuit in an opposite sense, and a modulation signal output circuit coupled to said anode circuit.

2. An electro-mechanical transducer system as defined in claim 1, wherein the shunt tuning capacitor for the second tuning inductor is a two-electrode variable-capacity phonograph pick-up device, and wherein the means providing the coupling connection for the grid circuit includes a single shielded conductor having at one end a relatively small number of inductive coupling turns with the second tuning inductor and having a grid coupling capacitor at the opposite end thereof.

3. An electro-mechanical transducer system as defined in claim 1, wherein the modulation signal output circuit is provided with a feedback connection to the grid circuit and includes a grid resistor for the oscillator, and wherein the means providing a low impedance coupling connection in the grid circuit with the second tuning inductor includes a grid capacitor for establishing with the grid resistor anode-bent demodulation of the output from the oscillator in said anode circuit.

4. An electro-mechanical transducer system as defiend in claim 1, wherein the tuning inductor in the anode circuit and the second tuning inductor are each of high inductance and low winding capacity between turns, and wherein the means for adjusting the resonance of the anode circuit includes an adjustable magnetic core for said anode circuit tuning inductor.

5. An electro-mechanical transducer system as defined in claim 1, wherein an absorption winding is inductively coupled to at least one of said tuning inductors and tuned to a frequency of the order of and lower than the mean frequency of the tuning control circuit of the oscillator for enhancing the modulation effect of said control circuit.

6. A high frequency modulated oscillator transducer system comprising, an electron-tube oscillator having a tuned anode circuit responsive to a predetermined relatively high frequency, said anode circuit including an adjustable tuning inductance, a variably tunable frequency control circuit for said oscillator comprising a tuning capacity element and a tuning inductance element in parallel, at least one of said elements being variable, means providing a low impedance grid circuit for the oscillator relatively loosely coupled to said last named inductance element, said frequency control circuit having a mean resonance frequency lower than the resonance frequency of the anode circuit, whereby as the frequency of the control circuit is varied the oscillation frequency varies with respect to the frequency of the anode circuit, and variation in the grid-to-anode capacity of the oscillator effectively varies the tuning of the anode circuit conjointly with and in an opposite sense to the frequency variation of the control circuit, thereby to enhance the modulation effect of the control circuit, means for demodulating the signal output of said oscillator, and means connected with the anode circuit for deriving the demodulated signal out put therefrom.

7. A high frequency modulated oscillator transducer system as defined in claim 6, wherein the means providing the low impedance grid circuit includes a low impedance cable having a single shielded conductor, and wherein the grid circuit is loosely coupled with the tuning inductance element of the frequency control circuit by a low impedance winding of relatively few turns included in circuit with said conductor.

8. A high frequency modulated oscillator transducer system comprising in combination, an electron-tube oscillator having a tuned high impedance anode circuit and a low impedance grid circuit coupled for the transfer of energy by the inter-electrodal grid-to-anode capacity thereof to establish and maintain oscillations, a tuned variable-frequency control circuit for said oscillator having a predetermined means frequency, means providing a low impedance connection and loose coupling for said grid circuit with said variable-frequency control circuit, an adjustable tuning inductance connected serially in the anode circuit and tunable by distributed capacity and said inter-electrodal capacity to a frequency slightly higher than the mean frequency of the main tuning control circuit, means for varying the tuning of said control circuit to modulate said oscillator, and means for deriving demodulated signals from said anode circuit.

9. A high frequency modulated oscillator transducer system comprising in combination, an electron-tube oscillator having an anode circuit and a grid circuit adapted to be coupled by the inter-electrodal capacities of an oscillator tube to establish and maintain oscillations, a main tuning control circuit for said oscillator having a relatively large tuning inductance element and a relatively small shunt tuning capacitance element resonant at a predetermined mean frequency, means providing a low impedance connection and loose coupling for said grid circuit with said main tuning control circuit, a tuning inductance connected serially in the anode circuit and tunable by distributed capacity and said inter-electrodal capacity to a frequency slightly higher than the mean frequency of the main tuning control circuit, means for varying one of the tuning elements of said tuning control circuit to modulate said oscillator, and means for deriving demodulated signals from said anode circuit.

10. A transducer system of the modulated oscillator type comprising in combination, a high frequency electron-tube oscillator having a tuned high impedance anode circuit and a low impedance grid circuit, a tuning inductor in the anode circuit, means including the grid-to-anode capacity of said oscillator for tuning said inductor to a predetermined high frequency, a main tuning control circuit for variably controlling the frequency of said oscillator to effect modulation thereof about a predetermined mean frequency, said tuning control circuit comprising a second tuning inductor and a shunt two-electrode variable tuning capacitor therefor having a relatively low capacity value, means providing loose coupling for said grid circuit with said tuning control circuit, means for adjusting the resonance of said anode circuit to a frequency slightly higher than the mean frequency of the main tuning control circuit whereby as the tuning of said main tuning control circuit is varied by variation of said capacitor the grid-to-anode capacity effectively varies the tuning of the anode circuit in an opposite sense to enhance the modulation, and a modulation signal output circuit coupled to said anode circuit.

11. A transducer system as defined in claim 10, wherein the modulation signal output circuit is provided with a feedback connection to the grid circuit including a grid resistor for the oscillator and a grid capacitor for establishing with the grid resistor anode-bend demodulation of the output from the oscillator in said anode circuit, and wherein the means providing loose coupling for the grid circuit with the tuning control circuit includes a low impedance coupling element common to both the grid and tuning control circuits.

12. A high frequency modulated oscillator transducer system comprising in combination, an electron tube oscillator having an anode, a cathode and a control grid, a variable capacity modulator device for said oscillator having a pair of spaced electrodes one of which is movable with respect to the other in response to a modulating force applied thereto, a main tuning inductance having terminals connected with the electrodes of said device to constitute therewith a variable high-frequency tuning control and modulator circuit for said oscillator of limited frequency variation range about a predetermined mean frequency, conductor means providing a low impedance signal conveying connection and inductive coupling between the oscillator control grid and said inductance adjacent one end thereof and a connection between said one end of the inductance and the cathode whereby a low impedance grid circuit for said oscillator is provided and loosely coupled to said inductance, a tuned high impedance anode circuit connected with said anode, a second tuning inductance in said anode circuit, movable tuning core means for said second inductance for adjusting the tuning of the anode circuit to resonate at a predetermined high frequency spaced slightly above the frequency variation range of the modulator circuit, said second inductance being further tuned and controlled by the grid-to-anode capacity of the oscillator which is effectively in shunt therewith and which varies in opposition to variations in the capacity of said modulator device whereby the modulation effect is enhanced, and a modulation signal output circuit connected with said anode circuit for deriving modulation signals from said oscillator.

13. A high frequency modulated oscillator transducer system as defined in claim 12, wherein the modulator device is a tone arm supported variable-capacity phonograph record pick-up with one of the electrodes constituted by a stylus element, and wherein the first named tuning inductance is located on the opposite end of the tone arm from the pick-up as a modulating unit therewith for the system.

14. A high frequency modulated oscillator transducer system for phonograph record reproduction and the like, comprising in combination, a variable-capacity pick-up and a tuning inductance connected in parallel to provide a variable frequency modulator circuit resonating at a predetermined mean frequency, said pick-up and tuning inductance being adapted to be carried by a tone arm as a modulator unit for the system, a low impedance cable extending from said unit and comprising a shielded conductor loosely coupled to said modulator circuit, an oscillator tube having a control grid and a cathode connected with said modulator circuit through said cable to provide a low impedance grid circuit, an anode circuit for said oscillator having an adjustable tuning inductance therein tuned by its distributed capacity and the grid-to-anode capacity of the oscillator tube to resonate at a frequency of the order of and higher than the mean frequency of the modulator circuit by a predetermined margin, means for operating said oscillator to provide anode-bend rectification in the anode circuit, and means for deriving a modulation signal from said anode circuit comprising an output coupling impedance serially in said anode circuit with said adjustable tuning inductance.

15. The combination as defined in claim 14, wherein a feed-back circuit is connected between the anode end of said output impedance and the grid circuit, and wherein a high resistance grid resistor is included serially in said feed-back circuit.

16. A phonograph transducer system comprising in combination, a high frequency electron-tube oscillator having a high impedance anode circuit and a low impedance grid circuit, a tuning inductor in the anode circuit, means including the grid-to-anode capacity of said oscillator for tuning said inductor to a predetermined high frequency, a main tuning control circuit for variably controlling the frequency of said oscillator to effect modulation thereof, said tuning control circuit comprising a second tuning inductor and a two electrode variable-capacity phonograph pickup device providing a shunt tuning capacitor therefor having a relatively low capacity value, means providing a relatively loose signal conveying coupling connection for said grid circuit with said tuning control circuit, said last named means including a shielded conductor having at one end a relatively small number of inductive coupling turns with the second tuning inductor, means for adjusting the resonance of said anode circuit to a frequency slightly higher than the mean resonance frequency of said tuning control circuit whereby as the tuning of the main tuning control circuit is varied the grid-to-anode capacity effectively varies the tuning of the anode circuit in an opposite sense, and a modulation signal output circuit coupled to said anode circuit.

17. A high frequency modulated oscillator phonograph-record reproducing system comprising in combination, an electron tube oscillator, a variable-capacity pickup device for said oscillator having a pair of spaced electrodes one of which is movable as a stylus element with respect to the other in response to record groove modulating force applied thereto and a main tuning inductance winding having terminals connected with the electrodes of said device to constitute therewith a variable high-frequency tuning control and modulator circuit for said oscillator of limited frequency variation range about a predetermined mean frequency, conductor means providing a low impedance signal conveying grid connection between the oscillator and said inductance and loosely inductively coupled to said inductance, a tuned high impedance anode circuit connected with said anode, a second tuning inductance in said anode circuit, movable tuning core means for said second inductance for adjusting the tuning of the anode circuit to resonate at a predetermined high frequency spaced slightly above the frequency variation range of the modulator circuit, said second inductance being further tuned and controlled by the grid-to-anode capacity of the oscillator which is effectively in shunt therewith and which varies in opposition to variations in the capacity of said pickup device whereby the modulation effect is enhanced, and a modulation signal output circuit connected with said anode circuit for deriving modulation signals from said oscillator.

References Cited in the file of this patent

UNITED STATES PATENTS

| Number | Name | Date |
|---|---|---|
| 2,410,982 | Koch | Nov. 12, 1946 |
| 2,412,051 | Sinnett | Dec. 3, 1946 |
| 2,481,886 | Sinnett | Sept. 13, 1949 |